United States Patent
Kim et al.

(10) Patent No.: US 9,416,316 B2
(45) Date of Patent: Aug. 16, 2016

(54) LIQUID CRYSTAL COMPOSITION AND LIQUID CRYSTAL DISPLAY COMPRISING THE SAME

(71) Applicant: Samsung Display Co., Ltd., Yongin, Gyeonggi-Do (KR)

(72) Inventors: Si Heun Kim, Hwaseong-si (KR); Eun A Kim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/511,322

(22) Filed: Oct. 10, 2014

(65) Prior Publication Data
US 2015/0267117 A1      Sep. 24, 2015

(30) Foreign Application Priority Data

Mar. 18, 2014    (KR) .................. 10-2014-0031844

(51) Int. Cl.
*G02F 1/1333* (2006.01)
*C09K 19/30* (2006.01)
*C09K 19/12* (2006.01)

(52) U.S. Cl.
CPC ............. *C09K 19/3003* (2013.01); *C09K 19/12* (2013.01); *C09K 2019/123* (2013.01); *C09K 2019/301* (2013.01); *C09K 2019/3004* (2013.01); *C09K 2019/3016* (2013.01); *C09K 2019/3019* (2013.01)

(58) Field of Classification Search
CPC ............... C09K 19/12; C09K 19/3003; C09K 2019/123; C09K 2019/301; C09K 2019/3019; C09K 2019/3004; C09K 2019/3016; G02F 1/1333
USPC .............. 428/1.1; 252/299.01, 299.6, 299.63, 252/299.66; 349/182
See application file for complete search history.

(56) References Cited

U.S. PATENT DOCUMENTS

| 8,199,290 B2 | 6/2012 | Huh et al. |
| 8,361,570 B2 | 1/2013 | Usui et al. |
| 8,530,007 B2 * | 9/2013 | Huh ............... C09K 19/20 252/299.01 |
| 8,623,473 B2 | 1/2014 | Kim et al. |
| 8,658,060 B2 | 2/2014 | Kim et al. |
| 9,017,572 B2 * | 4/2015 | Huh ............... C09K 19/20 252/299.63 |

FOREIGN PATENT DOCUMENTS

| JP | 2000351972 A | 12/2000 |
| JP | 2002069454 A | 3/2002 |
| JP | 2002285159 A | 10/2002 |
| JP | 2003255398 A | 9/2003 |
| JP | 2007161995 A | 6/2007 |
| JP | 4117832 B2 | 5/2008 |
| JP | 4896896 B2 | 1/2012 |

* cited by examiner

*Primary Examiner* — Geraldina Visconti
(74) *Attorney, Agent, or Firm* — Cantor Colburn LLP

(57) ABSTRACT

A liquid crystal composition including a first class including a polar liquid crystal compound having at least one fluorine atom and a second class compound including a neutral liquid crystal compound, in which the first class compound includes a first subclass compound having a dielectric anisotropy ($\Delta\in$) of 15 to 21 and a second subclass compound having a dielectric anisotropy ($\Delta\in$) of 5 to 15, and the first sub-class compound includes a liquid crystal compound expressed by the following Chemical Formula 1, Chemical Formula 1

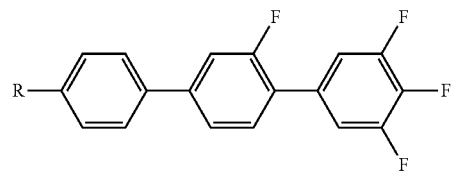

in which R is an alkyl group or an alkenyl group.

19 Claims, 8 Drawing Sheets

LIQUID CRYSTAL COMPOSITION AND LIQUID CRYSTAL DISPLAY COMPRISING THE SAME

This application claims priority to Korean Patent Application No. 10-2014-0031844 filed on Mar. 18, 2014, and all the benefits accruing therefrom under 35 U.S.C. §119, the content of which in its entirety is herein incorporated by reference.

BACKGROUND (a) Field

The present invention relates to a liquid crystal composition and a liquid crystal display including the same.

(b) Description of the Related Art

A liquid crystal display ("LCD") is one type of flat panel display that has become popularized. A liquid crystal display includes two sheets of display panels with field generating electrodes and a liquid crystal layer between the sheets. The liquid crystal display determines the directions of liquid crystal molecules in the liquid crystal layer and controls the transmittance of light passing through the liquid crystal layer by generating an electric field in the liquid crystal layer by applying a voltage to the field generating electrodes.

The liquid crystal layer is very important in the liquid crystal display in achieving a desired image by controlling the transmittance of light. In particular, with variation of use of liquid crystal displays, various characteristics such as low-voltage driving, high voltage holding ratio ("VHR"), a wide viewing angle, a wide operation temperature range, and high-speed response are required.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal composition having the advantage of including a plurality of liquid crystal compositions and of having improved physical properties such as rotational viscosity, phase transition temperature, refractive anisotropy, and dielectric anisotropy.

In an exemplary embodiment, a liquid crystal composition includes: a first class compound including a polar liquid crystal compound having at least one fluorine atom and a second class including neutral liquid crystal compound, in which the first class compound includes a first sub-class compound having a dielectric anisotropy (Δ∈) of about 15 to about 21 and a second sub-class compound having a dielectric anisotropy (Δ∈) of about 5 to about 15, and the first sub-class compound includes a liquid crystal compound expressed by following Chemical Formula 1, Chemical Formula 1

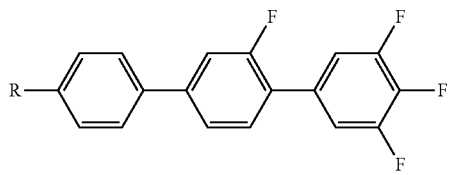

In which R is an alkyl group or an alkenyl group. R may be an alkyl group or an alkenyl group including two to five carbon atoms.

The first subclass compound is present in an amount of about 15 wt % to about 20 wt % based on the total weight of the liquid crystal composition.

The first subclass compound includes at least one liquid crystal compound expressed by following Chemical Formula 1-1 and Chemical Formula 1-2.

Chemical Formula 1-1

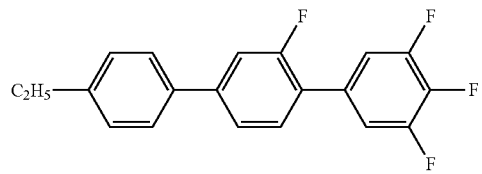

Chemical Formula 1-2

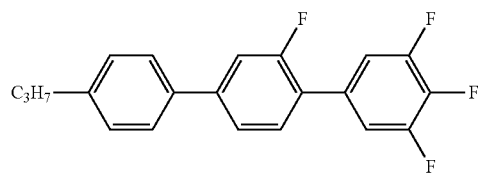

The second subclass compound includes at least one liquid crystal compound expressed by following Chemical Formal 2-1 to Chemical Formula 2-6, Chemical Formula 2-1

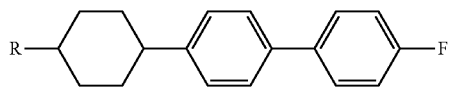

Chemical Formula 2-2

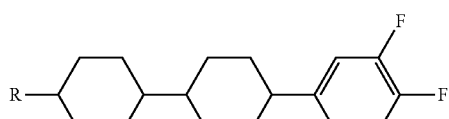

Chemical Formula 2-3

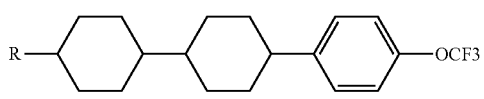

Chemical Formula 2-4

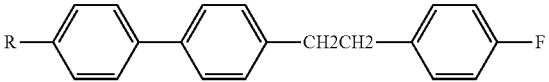

Chemical Formula 2-5

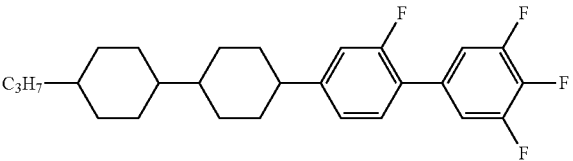

-continued

Chemical Formula 2-6

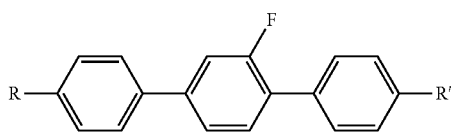

In which R and R' may be the same or different, and R and R' are an alkyl group or an alkenyl group having two to five carbon atoms.

The second subclass compound is present in an amount of about 20 wt % to about 40 wt % based on the total weight of the liquid crystal composition.

The second class compound includes at least one liquid crystal compound expressed by following Chemical Formal 3-1 to Chemical Formula 3-4,

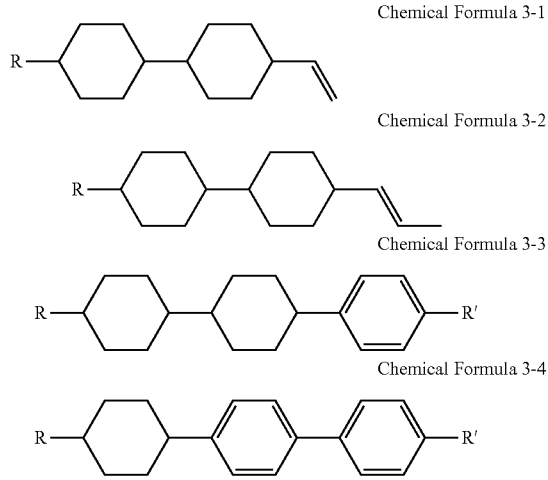

Chemical Formula 3-1

Chemical Formula 3-2

Chemical Formula 3-3

Chemical Formula 3-4

In which R and R' are the same or different, and R and R' are an alkyl group or an alkenyl group having two to five carbon atoms.

The second class compound is present in an amount of about 45 wt % to about 65 wt % based on the total weight of the liquid crystal composition.

Second class compounds expressed by Chemical Formula 3-1 and Chemical Formula 3-2 are present in an amount of about 30 wt % to about 55 wt % based on the total weight of the liquid crystal composition.

Based on the total weight of the liquid crystal composition, the first subclass compound expressed by Chemical Formula 1 is present in an amount of about 15 wt % to about 20 wt %, the second subclass compound expressed by Chemical Formula 2-1 is present in an amount of about 5 wt %, the second subclass compound expressed by Chemical Formula 2-2 is present in an amount of about 5 wt %, the second subclass compound expressed by Chemical Formula 2-3 is present in an amount of about 5 wt % to about 10 wt %, the second subclass compound expressed by Chemical Formula 2-4 is present in an amount of about 0 to about 10 wt %, the second subclass compound expressed by Chemical Formula 2-5 is present in an amount of about 5 wt % to about 10 wt, the second class compound expressed by Chemical Formula 3-1 is present in an amount of about 30 wt % to about 40 wt %, the second class compound expressed by Chemical Formula 3-2 is present in an amount of about 10 wt % to about 15 wt %, and the second class compound expressed by Chemical Formula 3-3 is present in an amount of about 5 wt % to about 10 wt %.

The liquid crystal composition has a dielectric anisotropy ($\Delta\epsilon$) of about 5 to about 8, a rotational viscosity ($\gamma$) of about 50 mPa·s to about 80 mPa·s, and phase transition temperature (Tin) of about 75° C. to about 80° C.

In an exemplary embodiment, a liquid crystal display includes: a first substrate; a second substrate facing the first substrate; a pair of field generating electrodes formed on at least one of the first substrate and the second substrate; and a liquid crystal layer disposed between the first substrate and the second substrate, in which the liquid crystal layer includes a first class compound including a polar liquid crystal compound having at least one fluorine atom, and a second class compound that includes a neutral liquid crystal compound, and the first class compound includes a first subclass compound having a dielectric anisotropy ($\Delta\epsilon$) of about 15 to about 21 and a second subclass compound having a dielectric anisotropy ($\Delta\epsilon$) of about 5 to about 15, and the first subclass compound includes a liquid crystal compound expressed by the Chemical Formula 1.

Based on the total weight of the liquid crystal composition, the first subclass compound expressed by Chemical Formula 1 is present in an amount of about 15 wt % to about 20 wt %, the second subclass compound expressed by the Chemical Formula 2-1 is present in an amount of about 15 wt % to about 20 wt %, the second subclass compound expressed by Chemical Formula 2-2 is present in an amount of about 5 wt %, the second subclass compound expressed by Chemical Formula 2-3 is present in an amount of about 5 wt % to about 10 wt %, the second subclass compound expressed by Chemical Formula 2-4 is present in an amount of about 0 to about 10 wt %, the second subclass compound expressed by Chemical Formula 2-5 is present in an amount of about 5 wt % to about 10 wt %, the second class compound expressed by Chemical Formula 3-1 is present in an amount of about 30 wt % to about 40 wt %, the second class compound expressed by Chemical Formula 3-2 is present in an amount of about 10 wt % to about 15 wt %, and the second class compound expressed by Chemical Formula 3-3 is present in an amount of about 5 wt % to about 10 wt %.

Liquid crystal molecules in the liquid crystal layer are horizontal to the surfaces of the first substrate and the second substrate.

In exemplary embodiments, the liquid crystal composition and the liquid crystal display including the liquid crystal composition satisfy desired physical properties such as rotational viscosity, phase transition temperature, refractive anisotropy, and dielectric anisotropy and the liquid crystal composition is also stable at a low temperature.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
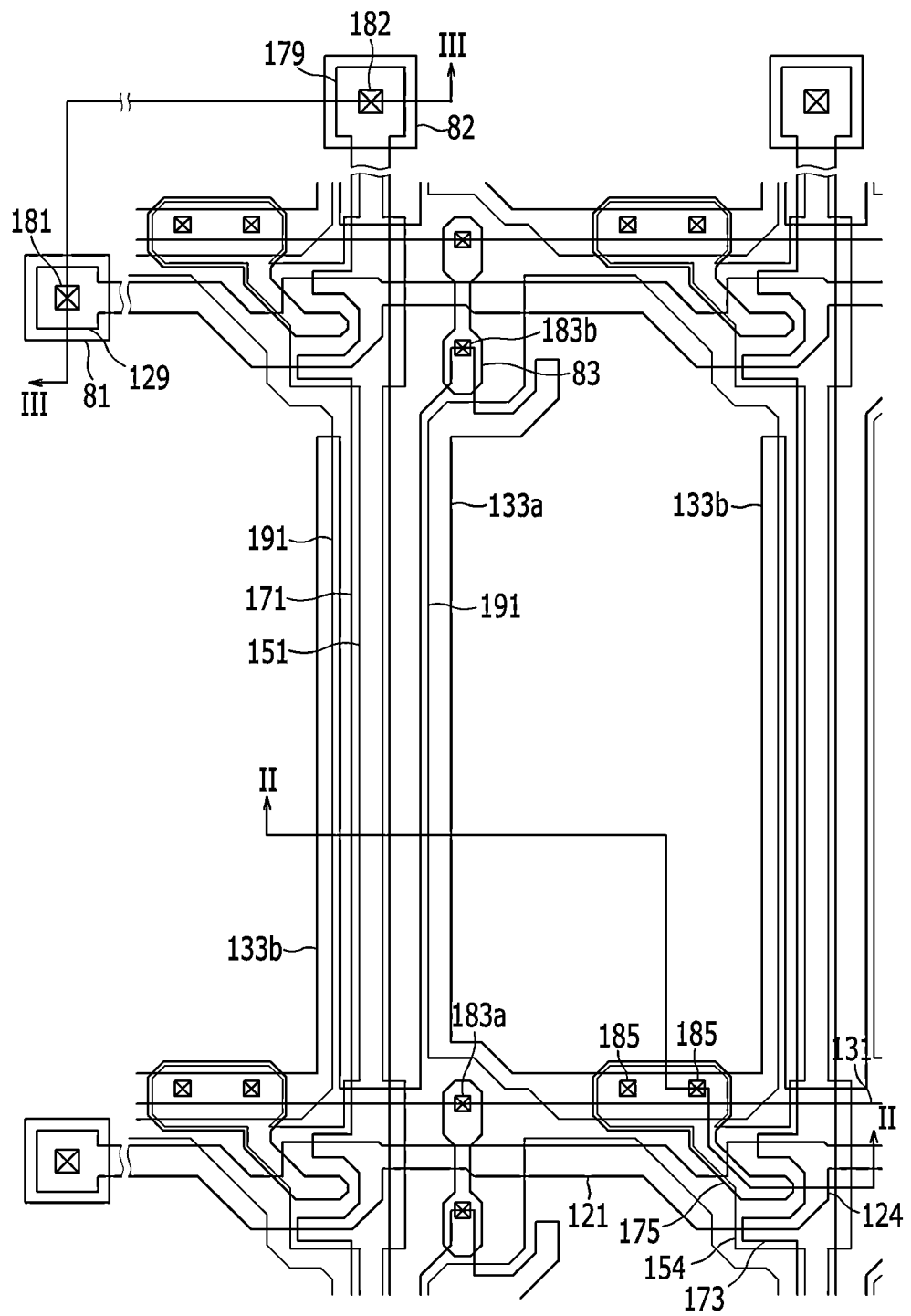
FIG. 1 is a plan view illustrating an exemplary embodiment of a liquid crystal display.

The present invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the drawings, the thickness of layers, films, panels, regions, and the like, are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In an exemplary embodiment, a liquid crystal display includes a first substrate, a second substrate facing the first substrate, a pair of field generating electrodes on at least one of the first substrate and the second substrate, and a liquid crystal layer between the first substrate and the second substrate, in which the liquid crystal layer includes a liquid crystal composition containing a polar liquid crystal compound having at least one fluorine atom and a neutral liquid crystal compound.

Hereinafter, an exemplary embodiment of a liquid crystal composition is described in detail.

The liquid crystal composition includes various liquid crystal compounds having different physical properties.

The liquid crystal composition includes a core group defining the central axis of the compound and a terminal group and/or a lateral group which is connected to the core group.

The core group may be connected to one or more cyclic compounds selected from a phenyl group, a cyclohexyl group, and a heterocycle.

The terminal group and/or lateral group may include a non-polar group such as an alkyl group, an alkoxy group, and an alkenyl group or a polar group such as a fluorine atom and physical properties such as dielectric anisotropy, which are dependent on the terminal group or the lateral group, are changeable.

In an exemplary embodiment, the liquid crystal compound includes a polar liquid crystal compound (also referred to as "first class compound") illustrating dielectric anisotropy, and a neutral liquid crystal compound (also referred to as "second class compound") not illustrating dielectric anisotropy.

The first class compound, a polar compound, is a liquid crystal compound including at least one fluorine atom in the core group, the terminal group, or the lateral group.

The first class compound may include a first subclass compound including a high polar (i.e. high polarity) compound having a dielectric anisotropy ($\Delta\epsilon$) of about 15 to about 21 and a second subclass compound including a middle polar (i.e. middle polarity) compound having a dielectric anisotropy ($\Delta\epsilon$) of about 5 to about 15.

The first subclass compound, a high polar compound having dielectric anisotropy ($\Delta\epsilon$) of about 15 to about 21, includes a polar liquid crystal compound having at least one fluorine atom. The first subclass compound includes a liquid crystal compound expressed by the following Chemical Formula 1.

Chemical Formula 1

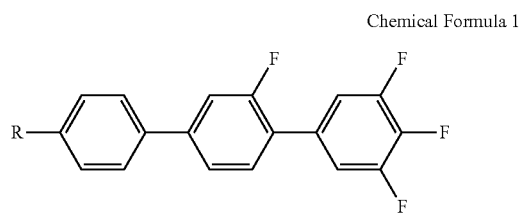

Herein, R is an alkyl group or an alkenyl group having two to five carbon atoms.

The liquid crystal compound of the first subclass expressed by Chemical Formula 1 may be present in an amount of about 15 wt % to about 20 wt % based on the entire (total) weight of the liquid crystal composition.

The first subclass compound illustrates high dielectric anisotropy and ensures the polarity of the liquid crystal composition. The first subclass compound includes at least one liquid crystal compound expressed by the following Chemical Formula 1-1 and Chemical Formula 1-2.

Chemical Formula 1-1

Chemical Formula 1-2

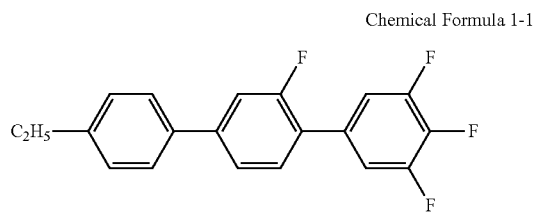

The second subclass compound, a middle polar compound having dielectric anisotropy ($\Delta\epsilon$) of about 5 to about 15, ensures the polarity of the liquid crystal composition and keeps the phase stability of the liquid crystal. The second subclass compound includes at least one liquid crystal compound expressed by the following Chemical Formula 2-1 to Chemical Formula 2-6.

Chemical Formula 2-1

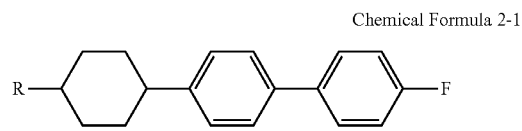

Chemical Formula 2-2

Chemical Formula 2-3

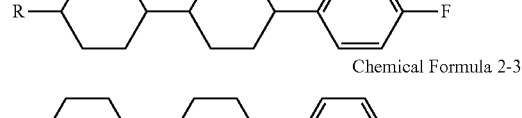

Chemical Formula 2-4

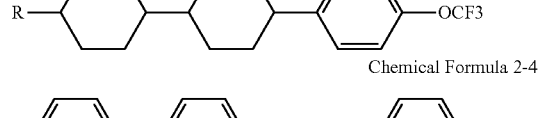

Chemical Formula 2-5

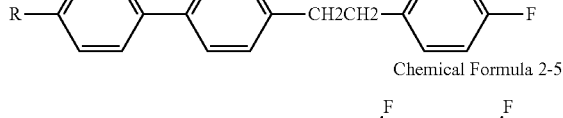

Chemical Formula 2-6

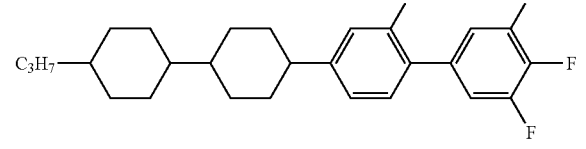

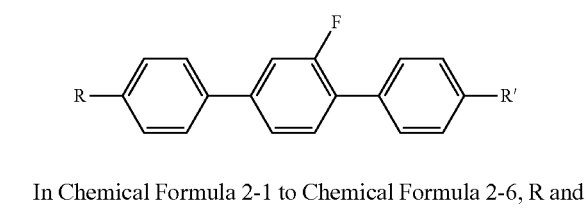

In Chemical Formula 2-1 to Chemical Formula 2-6, R and R' may be alkyl groups or alkenyl groups having two to five carbon atoms.

The liquid crystal compound of the second subclass compounds expressed by Chemical Formula 2-1 to Chemical Formula 2-6 may be present in an amount of about 20 wt % to about 40 wt % based on the entire weight of the liquid crystal composition.

The second class compound, a neutral compound not showing dielectric anisotropy, is a neutral liquid crystal compound without a fluorine atom in the core group, the terminal group, or the lateral group, and ensures the rotational viscosity ($\gamma$) of the liquid crystal composition. The second class compound includes at least one liquid crystal compound expressed by the following Chemical Formula 3-1 to Chemical Formula 3-4.

Chemical Formula 3-1

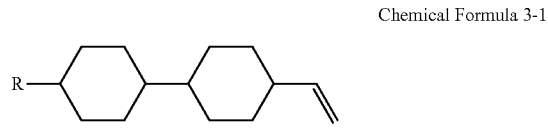

-continued

Chemical Formula 3-2

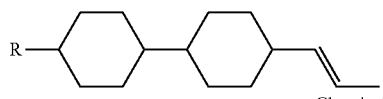

Chemical Formula 3-3

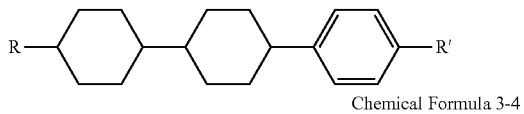

Chemical Formula 3-4

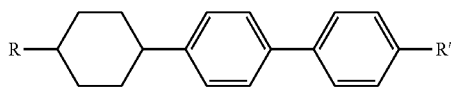

In Chemical Formula 3-1 to Chemical Formula 3-4, R and R' may be alkyl groups or alkenyl groups having two to five carbon atoms.

The liquid crystal compound of the second class compounds expressed by Chemical Formula 3-1 to Chemical Formula 3-4 may be present in an amount of about 45 wt % to about 65 wt % based on the entire weight of the liquid crystal composition. However, additional 2-ring liquid crystal compounds expressed by Chemical Formula 3-1 and Chemical Formula 3-2 may be included to ensure better rotational viscosity (γ) and the additional 2-ring liquid crystal compounds may be present in an amount of about 30 wt % to about 55 wt %.

Further, in an exemplary embodiment, the liquid crystal composition may include a first subclass compound expressed by Chemical Formula 1, second subclass compounds expressed by Chemical Formulae 2-1 to 2-5, and second class compounds expressed by Chemical Formulae 3-1 to 3-3. In the exemplary liquid crystal composition, the compound of Chemical Formula 1 is present in an amount of about 15 wt % to about 20 wt %; the compound of Chemical Formula 2-1 is present in an amount of about 5 wt %; the compound of Chemical Formulae 2-2 is present in an amount of about 5 wt %; the compound of Chemical Formulae 2-3 is present in an amount of about 5 wt % to about 10 wt %; the compound of Chemical Formulae 2-4 is present in an amount of 0 to about 10 wt %; the compound of Chemical Formulae is present in an amount of 2-5 about 5 wt % to about 10 wt %; the compound of Chemical Formula 3-1 is present in an amount of about 30 wt % to about 40 wt %, the compound of Chemical Formula 3-2 is present in an amount of about 10 wt % to about 15 wt %, and the compound of Chemical Formula 3-3 is present in an amount of about 5 wt % to about 10 wt %

The liquid crystal composition including the liquid crystal compounds of the first class and the second class may have dielectric anisotropy (Δ∈) of about 5 to about 8, a rotation viscosity (γ) of about 50 mPa·s to about 80 mPa·s, and a phase transition temperature (Tni) of about 75 degrees Celsius (° C.) to about 80° C.

A liquid crystal compound including a —CF$_2$O— group demonstrating high dielectric anisotropy is generally used to ensure polar characteristics in a liquid crystal composition that is used for a liquid crystal display. Meanwhile, the exemplary liquid crystal composition uses a high polar compound, a middle polar compound, and a neutral liquid crystal compound without a —CF$_2$O— group, so that the liquid crystal composition can replace the existing liquid crystal materials and competitive manufacturing costs of the liquid crystal material can be ensured.

A test was conducted to assess the properties of the exemplary liquid crystal composition described herein.

Liquid crystal panels for the test were manufactured by bonding two display panels with electrodes and injecting different liquid crystal compositions between the panels.

As exemplary embodiments, liquid crystal compositions were made by mixing the compound expressed by Chemical Formula 1 in an amount of 15.6 wt % (first subclass compound), compounds expressed by the Chemical Formulas 2-1 to 2-3, 2-5, and 2-6 in amounts of 5.9 wt %, 4.6 wt %, 8.3 wt %, 5.6 wt %, and 1.8 wt %, respectively (second subclass compounds), and compounds expressed by Chemical Formulas 3-1 to 3-3 in amounts of 39%, 12.2%, and 7%, respectively (second class compounds).

As a comparative example, a prior art liquid crystal composition including a generally-used —CF$_2$O— group was used. The components and amounts of the liquid crystal compounds used to prepare the Example and Comparative Example liquid crystal compositions are provided in the following Table 1.

TABLE 1

| Type | Remarks | Constitutional Formula | Comparative Example (wt %) | Example (wt %) |
|---|---|---|---|---|
| Neutral | Chemical Formula 3-1 | 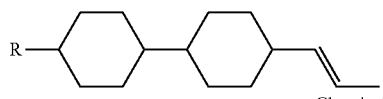 | 41 | 39 |
| | Chemical Formula 3-2 | 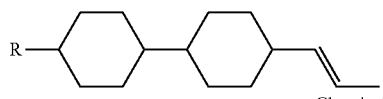 | — | 12.2 |
| | Chemical Formula 3-3 | 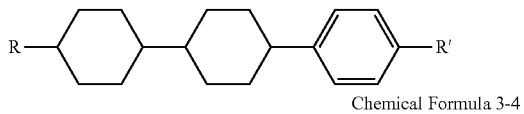 | — | 7 |

TABLE 1-continued
| Type | Remarks | Constitutional Formula | Comparative Example (wt %) | Example (wt %) |
|---|---|---|---|---|
| | Chemical Formula 3-4 | 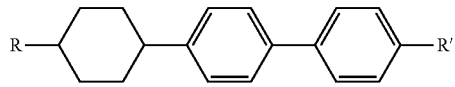 | 18.5 | — |
| | | Content of neutral compound | 76 | 60 |
| Polar | Chemical Formula 1 | 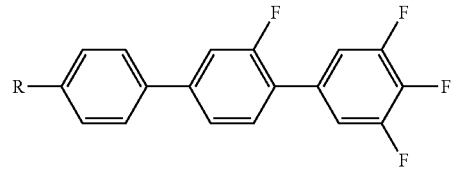 | — | 15.6 |
| | Chemical Formula 2-1 | 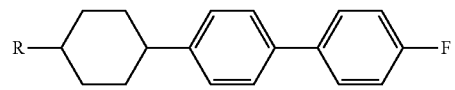 | — | 5.9 |
| | Chemical Formula 2-2 | 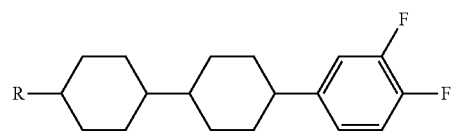 | — | 4.6 |
| | Chemical Formula 2-3 |  | — | 8.3 |
| | | 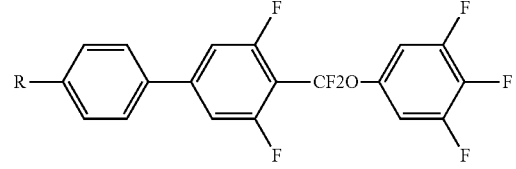 | 15 | — |
| | Chemical Formula 2-4 | 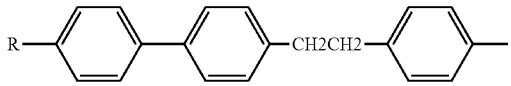 | — | — |
| | | 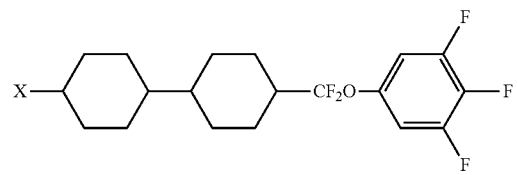 | 5.5 | — |
| | Chemical Formula 2-5 | 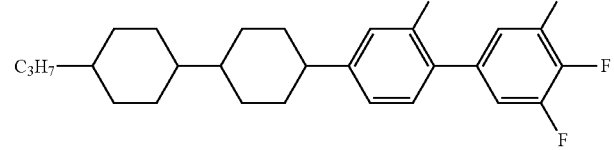 | 3.5 | 5.6 |
| | Chemical Formula 2-6 | 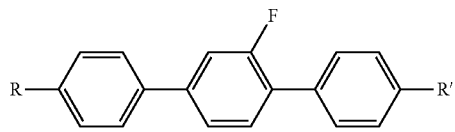 | 16.5 | 1.8 |
| | | Content of polar compound | 24 | 40 |

The phase transition temperature (Tni), the dielectric anisotropy (Δε), and the rotational viscosity (γ) were measured and the results are illustrated in the following Table 2.

TABLE 2

|  | Comparative Example | Example |
|---|---|---|
| Phase transition temperature (Tni) (° C.) | 80 | 80 |
| dielectric anisotropy (Δε) | 5.0 | 5.0 |
| Rotational viscosity (γ) (mPa · s) | 61 | 57 |

As illustrated in Table 2, it was found that the phase transition temperature, the dielectric anisotropy, and the rotational viscosity of the Comparative Example liquid crystal composition and the Example liquid crystal composition are similar and thus, the liquid crystal compositions of the Comparative example and the Example have similar properties.

Color coordinate, luminance, contrast ratio, transmittance, and response speed were measured to find the optical characteristics of the Example and the Comparative Example. The results are illustrated in the following Table 3.

The residual image characteristics after 70 hours and 110 hours were measured for the Example and the Comparative Example. The results are illustrated in FIG. 8.

Figure 8:
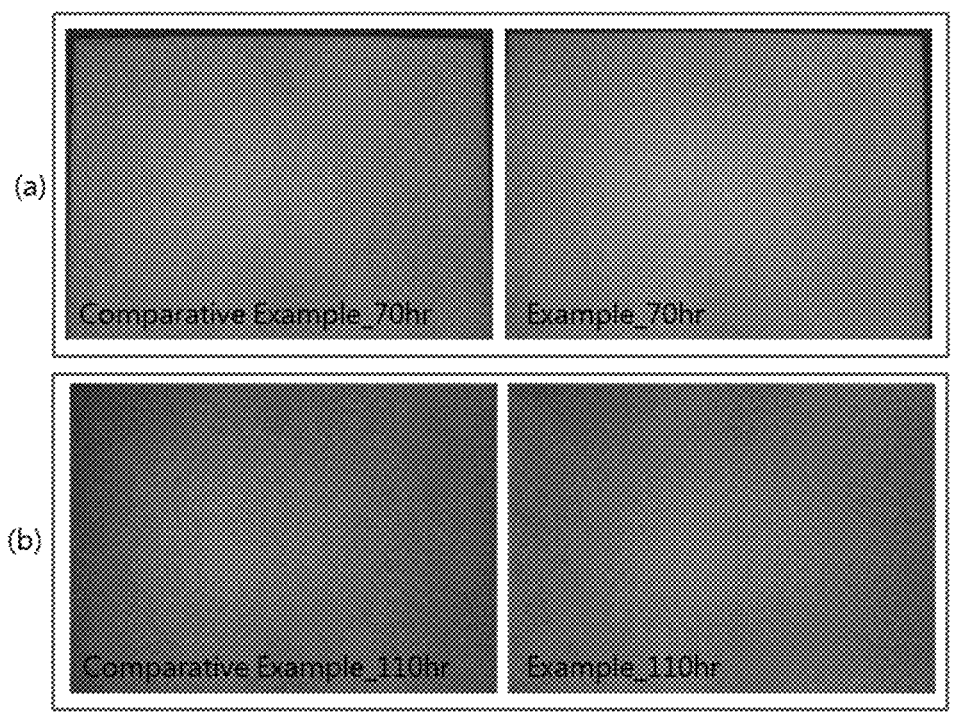
FIG. 8 shows the results of measuring residual images of a liquid crystal display provided with an Example liquid crystal composition or a Comparative Example liquid crystal composition, after 70 hours (hr) (FIG. 8A) and after 100 hr (FIG. 8B).

As illustrated in FIG. 8, it was found that the residual images were equivalent after 70 hours (hr) (FIG. 8A) and after 100 hr (FIG. 8B) for the Comparative Example and the Example.

Whether the phases of the liquid crystal compositions of the exemplary embodiment and the comparative example were measured, with the liquid crystal compositions kept for 120 hours or more at −25° C. and −30° C. in glass bottles of 4 ml to 5 ml, in order to estimate low-temperature stability of the exemplary embodiment and the comparative example. The result was illustrated in the following Table 4.

In Table 4, "OK" means that there was no phase change and "%" refers to the amount of liquid crystal composition demonstrating a phase change.

TABLE 3

| Liquid crystal | Panel ID | color coordinate | | luminance | | | Trans- mittance (%) | Response speed | | |
|---|---|---|---|---|---|---|---|---|---|---|
| | | | | | Center | | | R/T Total | R/T Rising | R/T Falling |
| | | Wx | Wy | 5P Avg | Lum | C/R | | | | |
| Compar- | Cell 1 | 0.31 | 0.331 | 308.4 | 325.7 | 1123.5 | 5.22 | 17.8 | 9.3 | 8.6 |
| ative | Cell 2 | 0.313 | 0.335 | 312.7 | 328 | 1022.4 | 5.22 | 18.3 | 9.4 | 8.9 |
| Example | Cell 3 | 0.309 | 0.326 | 305.1 | 331.1 | 1001.5 | 5.21 | 18.6 | 9.9 | 8.7 |
| (CF2O | average | 0.311 | 0.331 | 308.7 | 328.3 | 1049.1 | 5.21 | 18.24 | 9.52 | 8.73 |
| included) | STDEV | 0.002 | 0.004 | 3.8 | 2.71 | 65.227 | 0.006 | 0.372 | 0.3 | 0.176 |
| Example | Cell 1 | 0.312 | 0.334 | 305.8 | 331 | 1069.5 | 5.17 | 17.1 | 8.8 | 8.3 |
| | Cell 2 | 0.309 | 0.329 | 305.3 | 322.7 | 1156.6 | 5.2 | 16.6 | 8.6 | 8.1 |
| | Cell 3 | 0.31 | 0.329 | 297.4 | 312.1 | 1170.2 | 5.16 | 17.1 | 8.9 | 8.2 |
| | average | 0.311 | 0.331 | 302.8 | 321.9 | 1132.1 | 5.18 | 16.95 | 8.76 | 8.19 |
| | STDEV | 0.002 | 0.003 | 4.722 | 9.473 | 54.674 | 0.021 | 0.27 | 0.161 | 0.125 |

TABLE 4

| Liquid crystal | Keeping temper- ature (° C.) | Day 1 | Day 2 | Day 3 | Day 4 | Day 5 | Day 6 | Day 7 | Day 8 | Day 9 | Day 10 | Day 11 |
|---|---|---|---|---|---|---|---|---|---|---|---|---|
| Compar- ative Example | −25 | OK | OK | OK | OK | OK | 20% | 20% | 40% | 60% | 100% | 100% |
| | −30 | OK | OK | OK | OK | OK | 40% | 40% | 100% | 100% | 100% | 100% |
| Example | −25 | OK | OK | OK | OK | OK | OK | OK | OK | OK | OK | OK |
| | −30 | OK | OK | OK | OK | OK | OK | OK | OK | OK | OK | 80% |

As illustrated in Table 3, it was found that the color coordinate, luminance, contrast ratio, transmittance, and response speed of the Comparative Example and the Example are similar, and accordingly, the liquid crystal compositions of the Comparative Example and the Example have similar properties.

As illustrated in Table 4, it can be seen that the Example liquid crystal composition had no phase change for a longer period of time in comparison to the Comparative Example, and accordingly, it was found that the low-temperature stability of the Example liquid crystal composition increases further than that of the Comparative Example liquid crystal composition.

Figure 2:
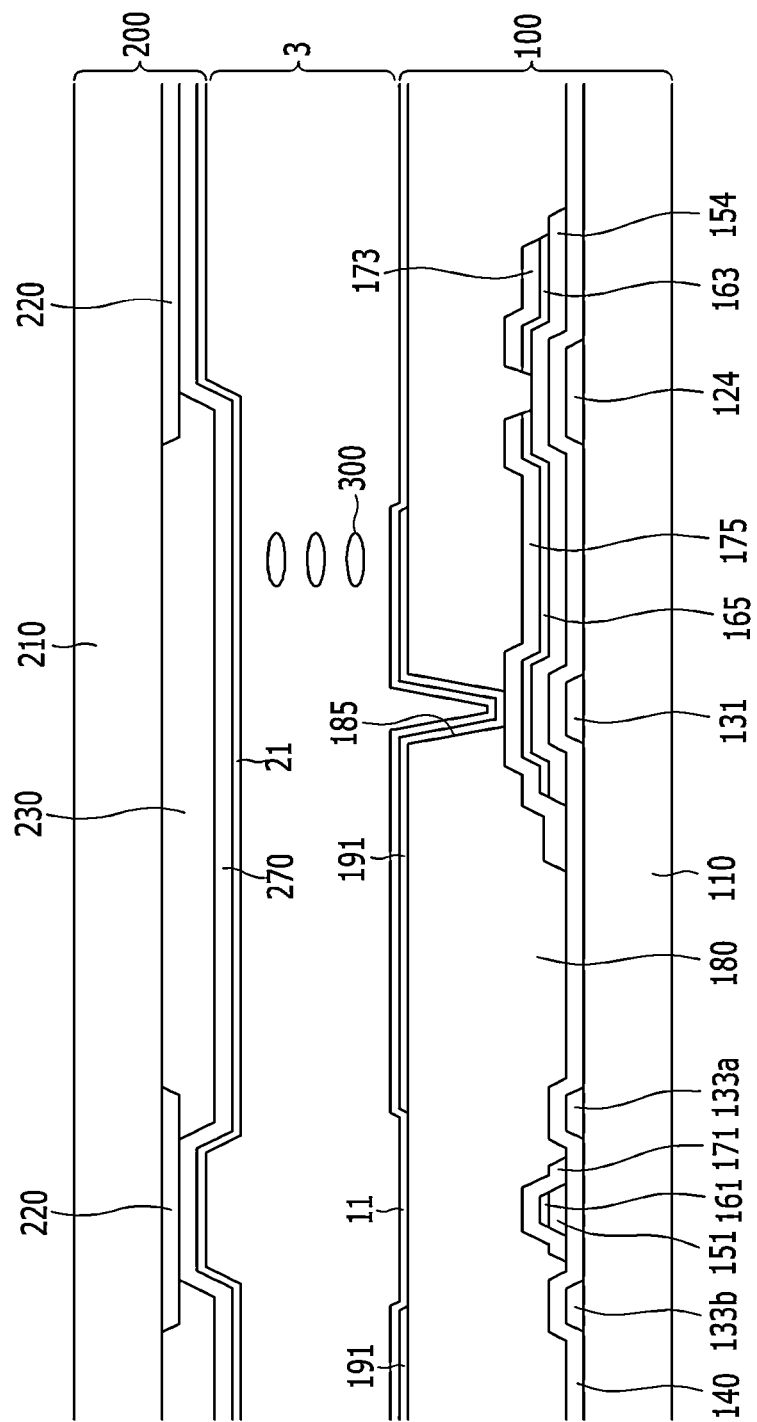
FIG. 2 is a cross-sectional view of the liquid crystal display of FIG. 1, taken along line II-II.
Figure 3:
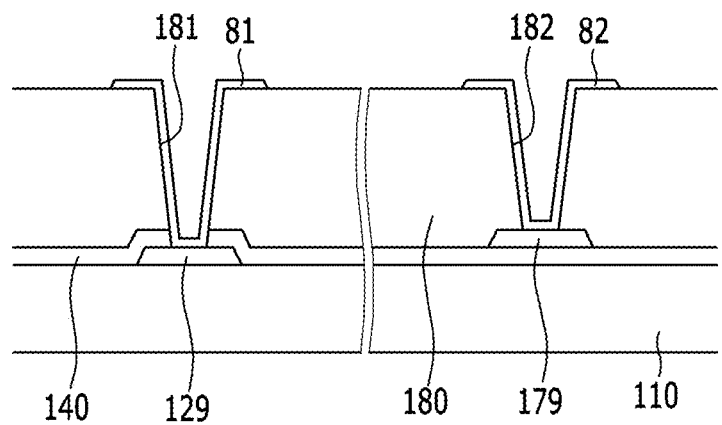
FIG. 3 is a cross-sectional view of the liquid crystal display of FIG. 1, taken along line III-III.

An exemplary embodiment of the liquid crystal display is described hereafter in detail with reference to FIGS. 1 to 3.

FIG. 1 is a plan view showing an exemplary embodiment of a liquid crystal display and FIGS. 2 and 3 are cross-sectional views of the exemplary liquid crystal display of FIG. 1, taken along lines II-II and III-III, respectively.

Referring to FIGS. 1 to 3, the exemplary liquid crystal display includes a thin film transistor display panel 100 and an upper display panel 200, which face each other, and a liquid crystal layer 3 between the two display panels 100 and 200.

First, the thin film transistor display panel 100 is described.

A plurality of gate lines 121 and a plurality of storage electrode lines 131 are formed on an insulation substrate 110 made of transparent glass or plastic.

The gate lines 121 transmit gate signals and usually transversely extend. Each of the gate lines 121 has a wide end 129 to connect a plurality of gate electrodes 124 protruding downward with another layer or an external driving circuit. A gate driving circuit (not illustrated) that generates a gate signal may be mounted on a flexible printed circuit (not illustrated) attached to the top of the substrate 110, may be mounted directly on the substrate 110, or may be integrated on the substrate 110.

The storage electrode line 131 receives a predetermined voltage and has a stem line (not illustrated) extending almost parallel to the gate line 121 and several pairs of first and second storage electrodes 133a and 133b. Each of the storage electrodes 131 is disposed between two gate lines 121 and the stem line is closer to the lower one of the two gate lines 121. The storage electrodes 133a and 133b have a fixed end connected with the stem line and a free end opposite to the fixed end. The fixed end of the first storage electrode 133a is wide and the free end is divided into two parts: a straight part and a curved part. However, the shape and arrangement of the storage electrode lines 131 may be changed in various ways.

The gate line 121 and the storage electrode line 131 may be made of aluminum or aluminum-based metal such as an aluminum alloy, silver (Ag) or silver-based metal such as a silver alloy, copper (Cu) or a copper-based metal such as a copper alloy, molybdenum (Mo) or a molybdenum-based metal such as a molybdenum alloy, chromium (Cr), tantalum (Ta), and titanium (Ti). However, they may have a multilayer structure including two conductive layers (not illustrated) having different physical properties.

The sides of the gate line 121 and the storage electrode line 131 are inclined with respect to the surface of the substrate 110 and the inclination angle may be about 30° to 80°.

A gate insulating layer 140 made of silicon nitride (SiNx) or silicon oxide (SiOx) is formed on the gate lines 121 and the storage electrode lines 131.

A plurality of semiconductor stripes 151 made of hydrogenated amorphous silicon (amorphous silicon is abbreviated to a-Si) or polysilicon is formed on the gate insulating layer 140. The semiconductor stripes 151 usually extend lengthwise and have a plurality of projections 154 that protrude toward the gate electrodes 124.

A plurality of ohmic contact stripes and islands 161 and 165 is formed on the semiconductor stripes 151. The ohmic contacts 161 and 165 may be made of a substance such as n+ hydrogenated amorphous silicon doped with n-type impurities such as phosphorous with high concentration or may be made of silicide. The ohmic contact stripes 161 has a plurality of projections 163 and the projections 163 and the ohmic contact islands 165 are arranged in pairs on the projections 154 of the semiconductor stripes 151.

The semiconductor stripes 151 and the sides of the ohmic contacts 161 and 165 are also inclined with respect to the surface of the substrate 110 and the inclination angle is about 30 degrees (°) to about 80°.

A plurality of data lines 171 and a plurality of drain electrodes 175 are formed on the ohmic contacts 161 and 165 and the gate insulating layer 140.

The data line 171 transmits a data signal and usually extends lengthwise to cross the gate lines 121. Each of the data lines 171 runs between the sets of adjacent storage electrodes 133a and 133b, across the storage electrode lines 131. Each of the data lines 171 has a wide end 179 to connect a plurality of source electrodes 173 extending toward the gate electrodes 124 with another layer or an external driving circuit. A data driving circuit (not illustrated) that generates a data signal may be mounted on a flexible printed circuit attached to the top of the substrate 110, may be mounted directly on the substrate 110, or may be integrated on the substrate 110.

The drain electrode 175 is separated from the data line 171 and faces the source electrode 173 with the gate electrode 124 therebetween.

One gate electrode 124, one source electrode 173, and one drain electrode 175 make one thin film transistor ("TFT"), together with the projection 154 of the semiconductor stripe 151 and the channel of the thin film transistor is formed at the projection 154 between the source electrode 173 and the drain electrode 175.

The data line 171 and the drain electrode 175 may be made of a low-resistant conductor, similar to the storage electrode line 131 and the gate line 121.

The sides of the data line 171 and the drain electrode 175 may be inclined with respect to the surface of the substrate 110 and the inclination angle may be about 30° to about 80°.

A passivation layer 180 is formed on the data line 171, the drain electrode 175, and the exposed portion of the semiconductor stripe 151. The passivation layer 180 is made of an inorganic insulator or an organic insulator and the surface may be smooth.

Contact holes 182 and 185 exposing the end 179 of the data line 171 and the drain electrode 175, respectively, are defined in the passivation layer 180. Contact hole 181 exposing the end 129 of the gate line 121, contact hole 183a exposing a portion of the storage electrode line 131 around the fixed end of the first storage electrode 133a, and contact hole 183b exposing the projection at the free end of the first storage electrode 133a, are defined in the passivation layer 180 and the gate insulating layer 140.

A plurality of pixel electrodes 191, a plurality of overpasses 83, and a plurality of contact assistants 81 and 82 are formed on the passivation layer 180. They may be made of a transparent conductive material such as indium tin oxide ("ITO") or indium zinc oxide ("IZO"), or a radioactive metal such as aluminum, silver, or chromium, or alloys thereof.

The pixel electrode 191 is physically and electrically connected with the drain electrode 175 through the contact hole 185 and receives a data voltage from the drain electrode 175. The pixel electrode 191 receiving the data voltage generates an electric field in cooperation with the common electrode 270 of another display panel 200 receiving a common voltage, thereby determining the direction of the liquid crystal molecules in the liquid crystal layer 3 between the two electrodes 191 and 270. The polarization of light passing through the liquid crystal layer 3 depends on the direction of the liquid crystal molecules determined as described above. The pixel electrode 191 and the common electrode 270 make a capacitor (hereinafter, referred to as a 'liquid crystal capacitor'), thereby keeping the applied voltage even after the thin film transistor is turned off.

The pixel electrode 191 overlaps the storage electrode line 131. The storage electrodes 133a and 133b, the pixel electrode 191 and the drain electrode 175 electrically connected with it, make a capacitor by overlapping the storage electrode line 131. The capacitor is referred to as a storage capacitor, and the storage capacitor increases the ability of the liquid crystal capacitor to keep voltage.

The contact assistants 81 and 82 are connected with the end 129 of the gate line 121 and the end 179 of the data line 171 through the contact holes 181 and 182, respectively. The contact assistants 81 and 82 complement the bonding ability between an external device and the end 129 of the gate line 121 and the end 179 of the data line 171, and protect them.

The overpass 83 crosses the gate line 121 and is connected to the exposed portion of the storage electrode line 131 and the exposed free end of the storage electrode 133b through the contact holes 183a and 183b positioned opposite each other with the gate line 121 therebetween. The storage electrode line 131, including the storage electrodes 133a and 133b can be used to fix defects of the gate line 121, the data line 171, or the thin film transistor, in cooperation with the overpass 83.

Next, the upper panel 200 facing the thin film transistor display panel 100 is described.

A light blocking member 220, which is also called a black matrix, is formed on an insulation substrate 210 made of transparent glass or plastic. The light blocking member 220 faces the pixel electrode 191, has a plurality of openings that have a shape almost the same as that of the pixel electrode 191, and prevents light leakage between the pixel electrodes 191. The light blocking member 220 may be composed of a portion corresponding to the gate line 121 and the data line 171 and a portion corresponding to the thin film transistor.

A plurality of color filters 230 is formed on the substrate 210. Most color filters 230 are in the region surrounded by the light blocking member 220 and may extend in any one direction. Each color filter 230 can illustrate one of the three primary colors of red, green, and blue.

A common electrode 270 made of a transparent conductor such as ITO or IZO is formed on the color filter 230.

The liquid crystal layer 3 has a positive dielectric anisotropy and the liquid crystal molecules 300 in the liquid crystal layer 3 are arranged with the long axes substantially parallel to the surface of the two display panels 100 and 200, when there is no electric field. The liquid crystal layer is formed from a liquid crystal composition.

In exemplary embodiments, the liquid crystal composition includes a first class compound having at least one fluorine atom and a second class compound including a neutral liquid crystal compound, the first class compound includes a first subclass compound having a dielectric anisotropy (Δ∈) of about 15 to about 21 and a second subclass compound having a dielectric anisotropy (Δ∈) of about 5 to about 15, and the first subclass compound includes a liquid crystal composition including the liquid crystal compound expressed by the following Chemical Formula 1.

Chemical Formula 1

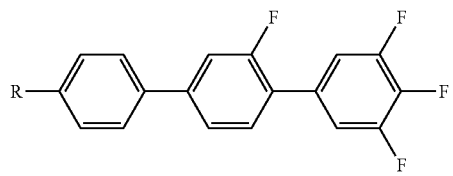

Herein, R is an alkyl group or an alkenyl group.

The display panels 100 and 200 are coated with alignment layers 11 and 12 on the inner sides and they may be horizontal alignment layers.

A polarizer (not illustrated) is on each of the outer sides of the display panels 100 and 200 and the polarization axes of the two polarizers are parallel or perpendicular to each other. One of the two polarizers may not be present in a reflective liquid crystal display.

An exemplary embodiment of a liquid crystal display is described in detail with reference to FIGS. 4 and 5.

Figure 4:
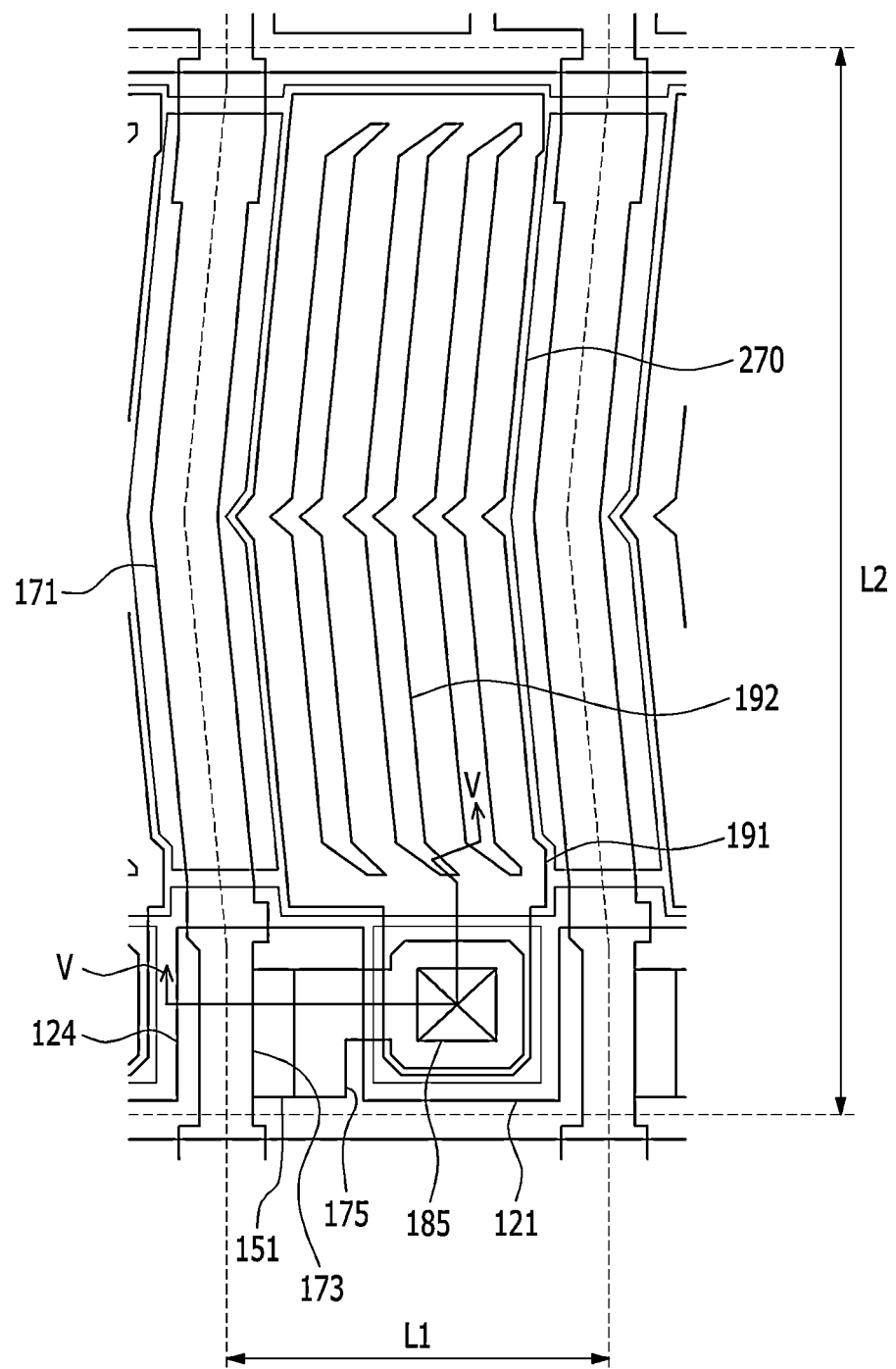
FIG. 4 is a plan view illustrating an exemplary embodiment of a liquid crystal display.
Figure 5:
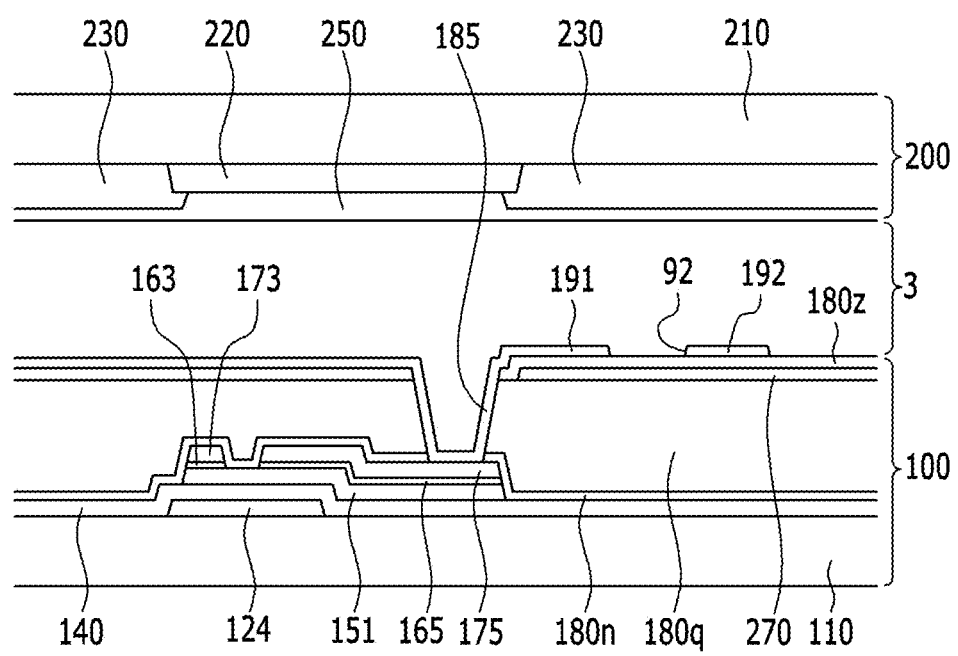
FIG. 5 is a cross-sectional view of the liquid crystal display according to the exemplary embodiment illustrated in FIG. 4, taken along line V-V.

FIG. 4 is a plan view showing a liquid crystal display according to another exemplary embodiment of the present invention and FIG. 5 is a cross-sectional view of the liquid crystal display according to another exemplary embodiment illustrated in FIG. 4, taken along line V-V.

Referring to FIGS. 4 and 5, a liquid crystal display according to an exemplary embodiment of the present invention includes a lower display panel 100 and an upper display panel 200 which face each other, and a liquid crystal layer 3 injected between the display panels. Although one pixel area is exemplified in the following description, the liquid crystal display according to an exemplary embodiment of the present invention may have resolution of about 200 pixels per inch (PPI) or more. That is, over 200 pixels can be included in an area of about 1×1 (length and width) inches on the liquid crystal display. Further, one pixel of the exemplary liquid crystal display may have the width L1 of about 40 micrometers (μm) or less and the length L2 of about 120 μm or less. As illustrated in the figures, the width L1 of the pixel is the gap between longitudinal centers of two adjacent data lines 171 and the length L2 of the pixel is the gap between the lateral centers of two adjacent gate lines 121.

First, the lower display panel 100 is described.

A gate conductor including gate lines 121 is formed on an insulation substrate 110 made of transparent glass or plastic.

The gate line 121 has a wide end (not illustrated) for connecting the gate electrode 124 with another layer or an external driving circuit. The gate line 121 may be made of aluminum or aluminum-based metal such as an aluminum alloy, silver (Ag) or silver-based metal such as a silver alloy, copper (Cu) or a copper-based metal such as a copper alloy, molybdenum (Mo) or a molybdenum-based metal such as a molybdenum alloy, chromium (Cr), tantalum (Ta), and titanium (Ti). However, the gate line 121 may have a multilayer structure including at least two conductive layers having different physical properties.

A gate insulating layer 140 made of silicon nitride (SiNx) or silicon oxide (SiOx) is formed on the gate conductor 121. The gate insulating layer 140 may have a multilayer structure including at least two insulating layers having different physical properties.

A semiconductor stripe 151 made of amorphous silicon or polysilicon is formed on the gate insulating layer 140. The semiconductor stripe 151 may include an oxide semiconductor.

Ohmic contacts 163 and 165 are formed on the semiconductor stripe 151. The ohmic contacts 163 and 165 may be made of a substance such as n+ hydrogenated amorphous silicon doped with n-type impurities such as phosphorous at high concentration or may be made of silicide. The ohmic contacts 163 and 165 may be disposed in a pair on the semiconductor stripe 151. When the semiconductor stripe 151 is an oxide semiconductor, the ohmic contacts 163 and 165 may not be provided.

A data line 171 including a source electrode 173 and a data conductor including a drain electrode 175 are formed on the ohmic contacts 163 and 165 and gate insulating layer 140.

The data line 171 has a wide end (not illustrated) for connection with another layer or an external driving circuit. The data line 171 transmits a data signal and usually extends lengthwise to cross the gate line 121.

The data line 171 may have a first curved portion having a curved shape to achieve the maximum transmittance of the liquid crystal display and the curved portions may make a V-shape by meeting each other at the middle region of a pixel area. A second curved portion curved to make a predetermined angle with the first curved portion may be further included in the middle region of the pixel area.

The first curved portion of the data line 171 may be curved at an angle of about 7° relative to a lengthwise reference line y (reference line extending in y direction) making an angle of 90 degrees to the direction (x direction) in which the gate line 121 extends. The second curved portion disposed in the middle region of a pixel area may be further curved to make an angle of about 7° to about 15° with respect to the first curved portion.

The source electrode 173 is a portion of the data line 171 and is disposed in the same line as the data line 171. The drain electrode 175 extends parallel to the source electrode 173. Accordingly, the drain electrode 175 is parallel with a portion of the data line 171.

The gate electrode 124, the source electrode 173, and the drain electrode 175 make one thin film transistor (TFT), together with the semiconductor stripe 151 and the channel of the thin film transistor is formed at the semiconductor stripe 151 between the source electrode 173 and the drain electrode 175.

The exemplary liquid crystal display includes the source electrodes 173 disposed in the same line as the data lines 171 and the drain electrodes extending parallel with the data lines 171, so it is possible to increase the area of the thin film transistor even without increasing the area occupied by the data conductor, and accordingly, the aperture ratio of the liquid crystal display can be increased.

The data line 171 and the drain electrode 175 may be made of a refractory metal such as molybdenum, chromium, tantalum, and titanium or alloys of thereof, and may have a multilayer structure including a refractory metal layer (not illustrated) and a low-resistant conductive layer (not illustrated). For example, the multilayer structure may be a double layer of a lower layer made of chromium or molybdenum (alloy) and an upper layer made of aluminum (alloy), or a triple layer of a lower layer made of molybdenum (alloy), a middle layer made of aluminum (alloy), and an upper layer made of molybdenum (alloy). However, the data line 171 and the drain electrode 175 may be made of various other metal or conductors. The width of the data line may be about 3.5 μm±0.75.

A first passivation layer 180n is disposed on the exposed portions of the data conductors 171, 173, and 175, the gate insulating layer 140, and the semiconductor stripe 151. The first passivation layer 180n may be made of an organic insulating material or an inorganic insulating material.

A second passivation layer 180q is disposed on the first passivation layer 180n. The second passivation layer 180q is optional and may not be present. The second passivation layer 180q may be a color filter. When the second passivation layer 180q is a color filter, the second passivation layer 180q can peculiarly illustrate one of the primary colors, and the primary colors may be three primary colors of red, green, and blue or yellow, cyan, and magenta. Though not illustrated in the figures, the color filter may further include a color filter illustrating mixtures of the primary colors or white other than the primary colors.

A common electrode 270 is formed on the second passivation layer 180q. The common electrode 270, which has a surface shape, may be formed in the shape of one plate on the front of the substrate 110 and may have an opening (not illustrated) on a corresponding region around the drain electrode 175. That is, the common electrode 270 may have the flat shape of a plate.

The common electrodes 270 in adjacent pixels are connected with each other and may receive a predetermined level of common voltage supplied from the outside of the display area.

A third passivation layer 180z is formed on the common electrode 270. The third passivation layer 180z may be made of an organic insulating material or an inorganic insulating material.

A pixel electrode 191 is formed on the third passivation layer 180z. The pixel electrode 191 has a curved edge substantially parallel to a first curved portion and a second curved portion of the data line 171. The pixel electrode 191 has a plurality of first cutouts 92 and includes a plurality of slit electrodes 192 defined by the first cutouts 92.

A first contact hole 185 exposing the drain electrode 175 is defined in the first passivation layer 180n, the second passivation layer 180q, and the third passivation layer 180z. The pixel electrode 191 is physically and electrically connected with the drain electrode 175 through the first contact hole 185 and receives a voltage from the drain electrode 175.

Though not illustrated in the figure, an alignment layer is coated on the pixel electrode 191 and the third passivation layer 180z and it may be a horizontal alignment layer and is rubbed in a predetermined direction. However, in the exemplary liquid crystal display, the alignment layer may include a photoreaction material for photo-alignment.

The upper display panel 200 is described hereinafter.

A light blocking member 220 is formed on the insulation substrate 210 made of transparent glass or plastic. The light blocking member 220 is also called a black matrix and prevents light leakage.

A plurality of color filters 230 is formed on the substrate 210. When the second passivation layer 180q of the lower display panel 100 is a color filter, the color filter 230 of the upper display panel 200 may not be provided. Further, the light blocking member 220 of the upper display panel 200 may be formed on the lower display panel 100.

An overcoat 250 is formed on the color filter 230 and the light blocking member 220. The overcoat 250 may be made of a (organic) insulator, prevents the color filter 230 from being exposed, and provides a flat surface. The overcoat 250 is optional and may not be present.

An alignment layer (not shown in FIG. 5) may be disposed on the overcoat 250.

The liquid crystal layer 3 includes the exemplary liquid crystal composition described above.

The long axes of the liquid crystal molecules of the liquid crystal layer 3 are arranged parallel to the display panels 100 and 200 and are spirally twisted at 90° due to the rubbing direction of the alignment layer of the lower display panel 100 to the upper display panel 200.

The pixel electrode 191 receives a data voltage from the drain electrode 175 and the common electrode 270 receives a predetermined level of common voltage from a common voltage applying unit outside the display area.

The pixel electrode 191 and the common electrode 270, which are field generating electrode, generate an electric field, so the liquid crystal molecules (not shown) in the liquid crystal layer 3 on the electrodes 191 and 270 are rotated parallel to the electric field. The polarization of light passing through the liquid crystal layer 3 depends on the rotation direction of the liquid crystal molecules determined as described above is changeable.

Next, a liquid crystal display according to another exemplary embodiment of the present invention is described in detail with reference to FIGS. 6 and 7.

Figure 6:
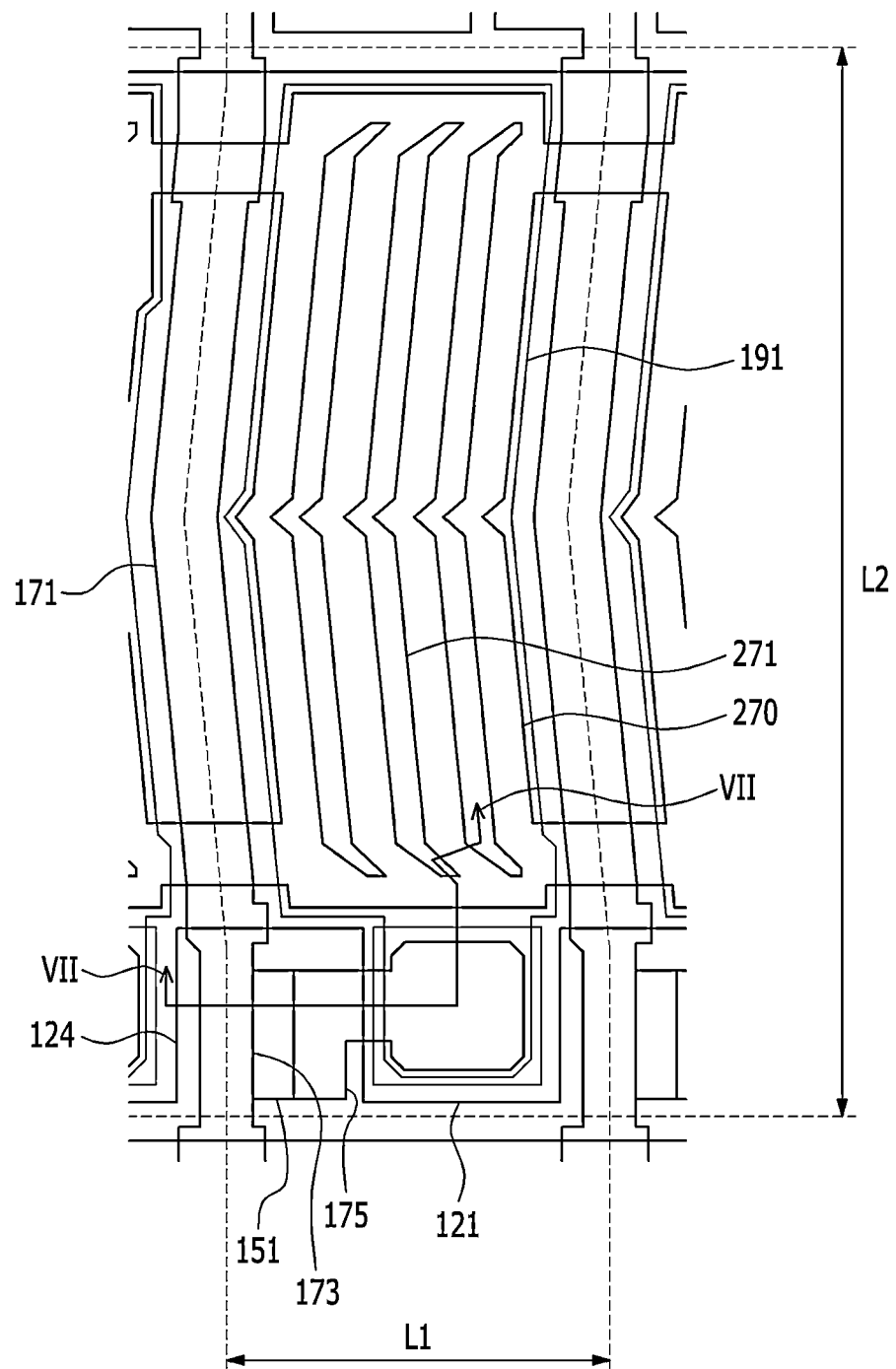
FIG. 6 is a plan view illustrating an exemplary embodiment of a liquid crystal display.
Figure 7:
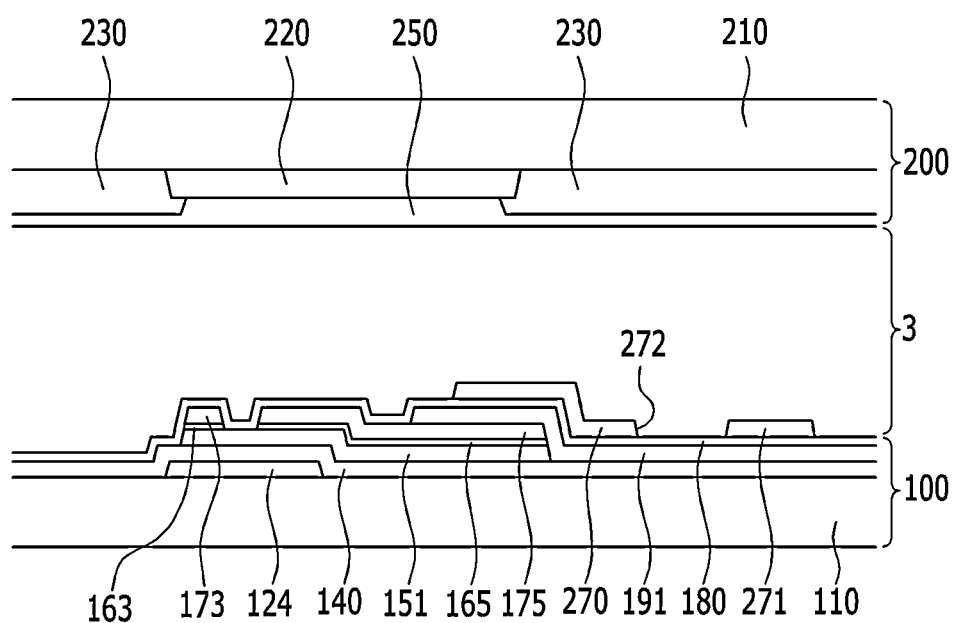
FIG. 7 is a cross-sectional view of the liquid crystal display according to the exemplary embodiment illustrated in FIG. 6, taken along line VII-VII.

Referring to FIGS. 6 and 7, the exemplary liquid crystal display is similar to, but different from, the exemplary embodiment of a liquid crystal display illustrated in FIGS. 5 and 6. FIG. 6 is a plan view illustrating an exemplary embodiment of a liquid crystal display, and FIG. 7 is a cross-sectional view of the liquid crystal display according to the exemplary embodiment illustrated in FIG. 6, taken along line VII-VII.

Referring to FIGS. 6 and 7, a liquid crystal display according to an exemplary embodiment of the present invention includes a lower display panel 100 and an upper display panel 200 which face each other, and a liquid crystal layer 3 injected between the display panels. Although one pixel area is exemplified in the following description, the exemplary liquid crystal display may have resolution of about 200 PPI or more. That is, over 200 pixels can be included in an area of 1×1 (length and width) in the liquid crystal display. Further, one pixel of the exemplary liquid crystal display may have a width L1 of about 40 μm or less and a length L2 of about 120 μm or less. As illustrated in the figures, the width L1 of the pixel is the gap between longitudinal centers of two adjacent data lines 171 and the length L2 of the pixel is the gap between lateral centers of two adjacent gate lines 121.

First, the lower display panel 100 is described.

A gate conductor including gate lines 121 is formed on the substrate 110.

A gate insulating layer 140 made of silicon nitride (SiNx) or silicon oxide (SiOx) is formed on the gate conductor 121.

A semiconductor 154 is formed on the gate insulating layer 140.

Ohmic contacts 163 and 165 are formed on the semiconductor stripe 151. When the semiconductor stripe 151 is an oxide semiconductor, the ohmic contacts 163 and 165 may not be provided.

A data line 171 including a source electrode 173 and a data conductor including a drain electrode 175 are formed on the ohmic contacts 163 and 165 and gate insulating layer 140.

A pixel electrode 191 is formed directly on the drain electrode 175. The pixel electrode 191 has the shape of a surface, that is, a plate and is disposed in one pixel area.

A passivation layer 180 is disposed on the exposed portions of the data conductors 171, 173, and 175, the gate insulating layer 140, and the semiconductor stripe 151 and on the pixel electrode 191. However, in the exemplary liquid crystal display, the passivation layer 180 is disposed between the pixel electrode 191 and the data line 171 and the pixel electrode 191 may be connected with the drain electrode 175 through a contact hole (not illustrated) defined in the passivation layer 180.

A common electrode 270 is formed on the passivation layer 180. The common electrodes 270 are connected with each other and receive a common voltage from a common voltage applying unit outside the display area.

The common electrode 270 includes a curved edge substantially parallel with a first curved portion and a second curved portion of the data line 171 and the common electrodes 270 in adjacent pixels are connected with each other. The common electrode 270 has a plurality of second cutouts 272 and includes a plurality of second slit electrodes 271 defined by the second cutouts 272.

Though not illustrated in the figure, an alignment layer is coated on the common electrode 270 and the passivation layer 180 and it may be a horizontal alignment layer which is rubbed in a predetermined direction. However, in other exemplary embodiments of the liquid crystal display, the alignment layer may include a photoreaction material for photo-alignment.

Hereinafter, the upper display panel 200 is described.

A light blocking member 220 is formed on the insulation substrate 210. A plurality of color filters 230 are formed on the substrate 210. The color filter 230 may be disposed on the lower display panel 100, in which the light blocking member 220 may be disposed on the lower display panel 100.

An overcoat 250 is formed on the color filter 230 and the light blocking member 220. The overcoat 250 may or may not be present.

An alignment layer may be disposed on the overcoat 250.

The liquid crystal layer 3 includes the exemplary liquid crystal composition described herein.

The long axes of the liquid crystal molecules (not shown) of the liquid crystal layer 3 are arranged parallel to the display panels 100 and 200 and are spirally twisted at an angle of about 90° from the rubbing direction of the alignment layer of the lower display panel 100 to the upper display panel 200.

In the exemplary embodiments described above, while the liquid crystal layer for a twist nematic mode or a coplanar electrode ("CE") mode was described, it is apparent that the present invention may be similarly applied to a liquid crystal display for a vertical alignment ("VA") mode.

The exemplary liquid crystal composition according and the liquid crystal display including the liquid crystal composition, satisfy desired physical properties such as rotational viscosity, phase transition temperature, refractive anisotropy, and dielectric anisotropy. Furthermore, the exemplary liquid crystal composition is stable at a low temperature.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal composition comprising:
   a first class polar liquid crystal compound comprising a first subclass compound having a dielectric anisotropy of 15 to 21 and a second subclass compound having a dielectric anisotropy of 5 to 15; and
   a second class neutral liquid crystal compound comprising at least one compound expressed by following Chemical Formula 3-1 to Chemical Formula 3-4,
   wherein the first subclass compound is at least one compound expressed by following Chemical Formula 1, and the second subclass compound is at least one compound expressed by following Chemical Formula 2-1 to Chemical Formula 2-5,

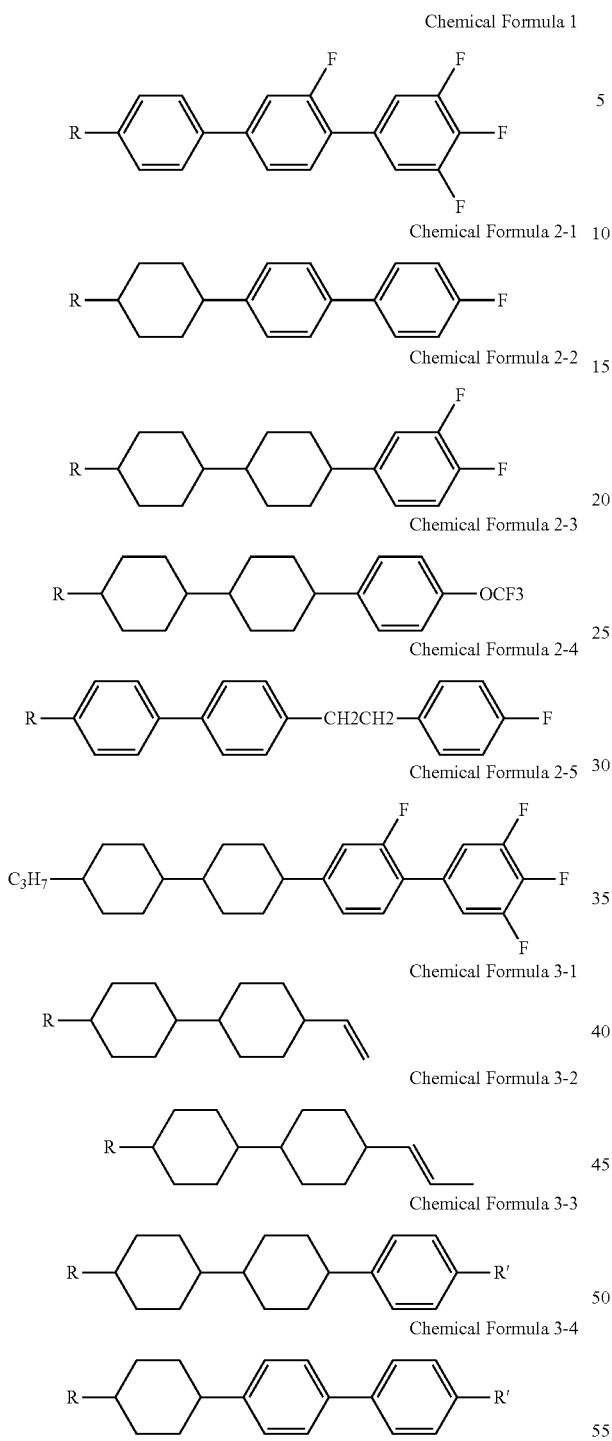

Chemical Formula 1

Chemical Formula 2-1

Chemical Formula 2-2

Chemical Formula 2-3

Chemical Formula 2-4

Chemical Formula 2-5

Chemical Formula 3-1

Chemical Formula 3-2

Chemical Formula 3-3

Chemical Formula 3-4 wherein R and R' are the same or different and R and R' are an alkyl group or an alkenyl group having two to five carbon atoms.

2. The liquid crystal composition of claim 1, wherein: the first subclass compound is present in an amount of about 15 wt % to about 20 wt % based on the total weight of the liquid crystal composition.

3. The liquid crystal composition of claim 1, wherein: the first subclass compound is at least one compound expressed by following Chemical Formula 1-1 and Chemical Formula 1-2

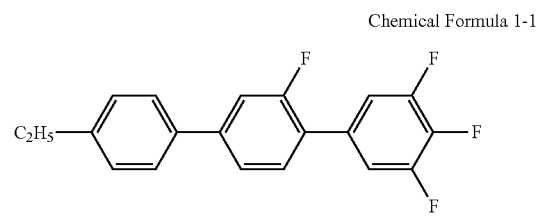

Chemical Formula 1-1

Chemical Formula 1-2

4. The liquid crystal composition of claim 3, comprising the second subclass compounds expressed by Chemical Formula 2-1, Chemical Formula 2-2, Chemical Formula 2-3 and Chemical Formula 2-5,

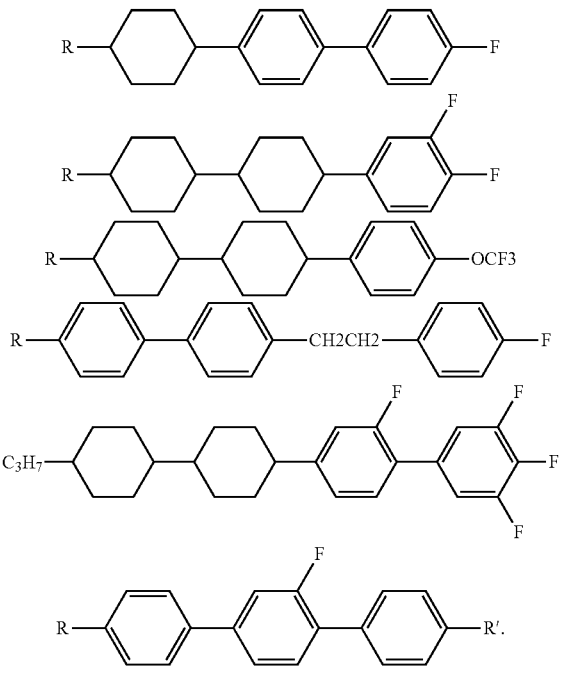

5. The liquid crystal composition of claim 4, wherein: the second subclass compounds are present in an amount of about 20 wt % to about 40 wt % based on the total weight of the liquid crystal composition.

6. The liquid crystal composition of claim 5, comprising the second class neutral liquid crystal compounds expressed by Chemical Formula 3-1 to Chemical Formula 3-4

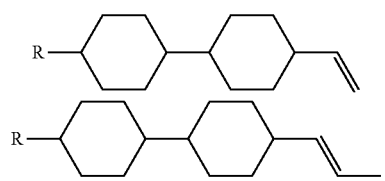

-continued

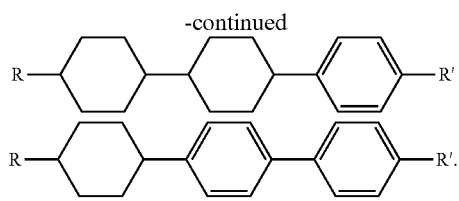

7. The liquid crystal composition of claim 6, wherein: the second class neutral liquid crystal compounds are present in an amount of about 45 wt % to about 65 wt % based on the total weight of the liquid crystal composition.

8. The liquid crystal composition of claim 7, wherein: the second class neutral liquid crystal compounds of Chemical Formula 3-1 and Chemical Formula 3-2 are present in an amount of about 30 wt % to about 55 wt % based on the total weight of the liquid crystal composition.

9. The liquid crystal composition of claim 8, wherein: based on the total weight of the liquid crystal composition,
the first subclass compound expressed by Chemical Formula 1 is present in an amount of about 15 wt % to about 20 wt %,
the second subclass compound expressed by Chemical Formula 2-1 is present in an amount of about 5 wt %,
the second subclass compound expressed by Chemical Formula 2-2 is present in an amount of about 5 wt %,
the second subclass compound expressed by Chemical Formula 2-3 is present in an amount of about 5 wt % to about 10 wt %,
the second subclass compound expressed by Chemical Formula 2-4 is present in an amount of about 0 to about 10 wt %,
the second subclass compound expressed by Chemical Formula 2-5 is present in an amount of about 5 wt % to about 10 wt,
the second class neutral liquid crystal compound expressed by Chemical Formula 3-1 is present in an amount of about 30 wt % to about 40 wt %,
the second class neutral liquid crystal compound expressed by Chemical Formula 3-2 is present in an amount of about 10 wt % to about 15 wt %, and
the second class neutral liquid crystal compound expressed by Chemical Formula 3-3 is present in an amount of about 5 wt % to about 10 wt %.

10. The liquid crystal composition of claim 1, wherein: the liquid crystal composition has dielectric anisotropy of about 5 to about 8, a rotational viscosity of about 50 mPa·s to about 80 mPa·s, and a phase transition temperature of about 75° C. to about 80° C.

11. A liquid crystal display comprising:
a first substrate;
a second substrate facing the first substrate;
a pair of field generating electrodes formed on at least one of the first substrate and the second substrate; and
a liquid crystal layer disposed between the first substrate and the second substrate,
wherein the liquid crystal layer comprises:
a first class polar liquid crystal compound comprising a first subclass compound having a dielectric anisotropy of 15 to 21 and a second subclass compound having a dielectric anisotropy of 5 to 15, and
a second class neutral liquid crystal compound comprising at least one compound expressed by following Chemical Formula 3-1 to Chemical Formula 3-4,
wherein the first subclass compound is at least one compound expressed by following Chemical Formula 1, and the second subclass compound is at least one compound expressed by following Chemical Formula 2-1 to Chemical Formula 2-5,

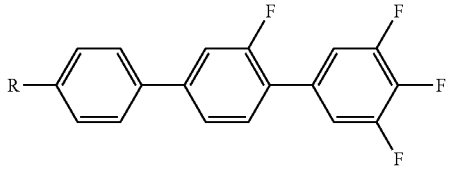

Chemical Formula 1

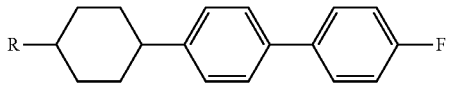

Chemical Formula 2-1

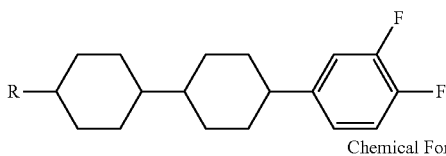

Chemical Formula 2-2

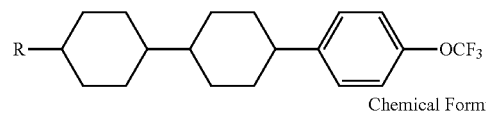

Chemical Formula 2-3

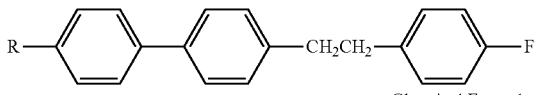

Chemical Formula 2-4

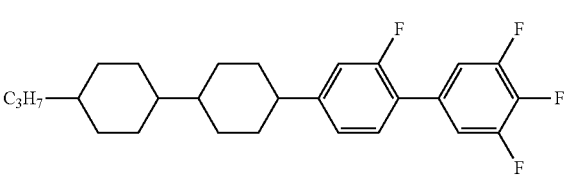

Chemical Formula 2-5

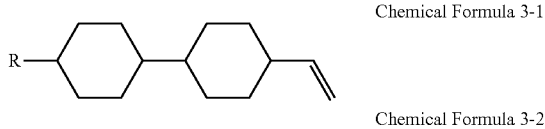

Chemical Formula 3-1

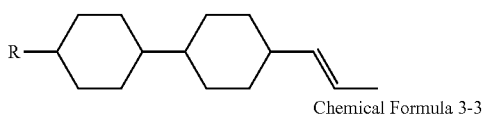

Chemical Formula 3-2

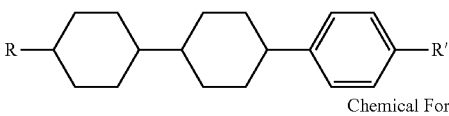

Chemical Formula 3-3

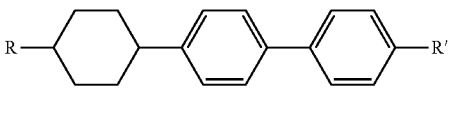

Chemical Formula 3-4 wherein R and R' are the same or different and R and R' are an alkyl group or an alkenyl group having two or five carbon atoms.

12. The liquid crystal display of claim 11, wherein: the first subclass compound is at least one compound expressed by following Chemical Formula 1-1 and Chemical Formula 1-2

Chemical Formula 1-1

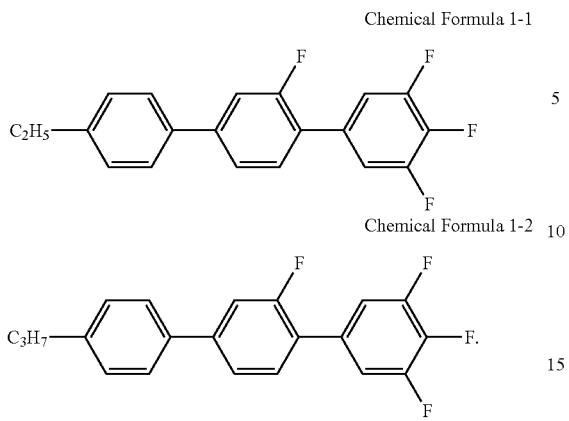

Chemical Formula 1-2

13. The liquid crystal display of claim 12, wherein:
the liquid crystal layer comprises the second subclass compounds expressed by Chemical Formula 2-1, Chemical Formula 2-2, Chemical Formula 2-3, and Chemical Formula 2-5

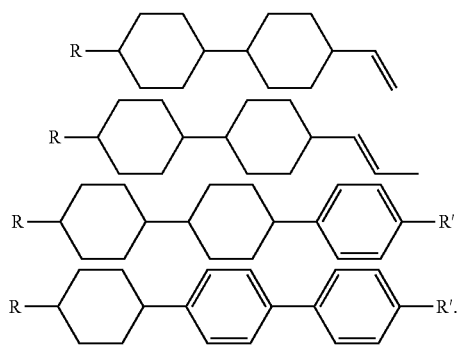

14. The liquid crystal display of claim 13, wherein: the liquid crystal layer comprises the second class neutral liquid crystal compounds expressed by Chemical Formula 3-1 to Chemical Formula 3-4

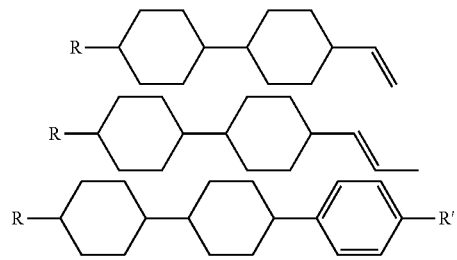

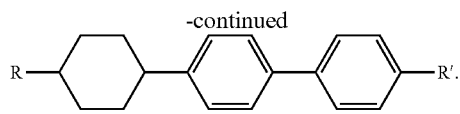

15. The liquid crystal display of claim 14, wherein:
the first subclass compound is present in an amount of about 15 wt % to about 20 wt % based on the total weight of the liquid crystal composition,
the second subclass compound is present in an amount of about 20 wt % to about 40 wt % based on the entire weight of the liquid crystal composition, and
the second class neutral liquid crystal compound is present in an amount of about 45 wt % to about 65 wt % based on the entire weight of the liquid crystal composition.

16. The liquid crystal display of claim 15, wherein: second class neutral liquid crystal compounds expressed by Chemical Formula 3-1 and Chemical Formula 3-2 are present in an amount of about 30 wt % to about 55 wt % based on the total weight of the liquid crystal composition.

17. The liquid crystal display of claim 16, wherein: based on the total weight of the liquid crystal composition,
the first subclass compound expressed by Chemical Formula 1 is present in an amount of about 15 wt % to about 20 wt %,
the second subclass compound expressed by the Chemical Formula 2-1 is present in an amount of about 15 wt % to about 20 wt %,
the second subclass compound expressed by Chemical Formula 2-2 is present in an amount of about 5 wt %,
the second subclass compound expressed by Chemical Formula 2-3 is present in an amount of about 5 wt % to about 10 wt %,
the second subclass compound expressed by Chemical Formula 2-4 is present in an amount of about 0 to about 10 wt %,
the second subclass compound expressed by Chemical Formula 2-5 is present in an amount of about 5 wt % to about 10 wt %,
the second class compound expressed by Chemical Formula 3-1 is present in an amount of about 30 wt % to about 40 wt %,
the second class neutral liquid crystal compound expressed by Chemical Formula 3-2 is present in an amount of about 10 wt % to about 15 wt %, and
the second class neutral liquid crystal compound expressed by Chemical Formula 3-3 is present in an amount of about 5 wt % to about 10 wt %.

18. The liquid crystal display of claim 15, wherein: the liquid crystal composition has a dielectric anisotropy of about 5 to about 8, a rotational viscosity of about 50 mPa·s to about 80 mPa·s, and a phase transition temperature of about 75° C. to about 80° C.

19. The liquid crystal display of claim 11, wherein: liquid crystal molecules in the liquid crystal layer are horizontal to the surfaces of the first substrate and the second substrate.

* * * * *